United States Patent [19]

Coquerel

[11] Patent Number: 5,566,215
[45] Date of Patent: Oct. 15, 1996

[54] METHOD AND DEVICE FOR RESTORING A CLOCK SIGNAL PUNCTUATING THE TRANSMISSION OF RECEIVED SIGNALS

[75] Inventor: Patrick Coquerel, Sartrouville, France

[73] Assignee: Institut Francais du Petrole, Rueil-Malmaison, France

[21] Appl. No.: 972,814

[22] Filed: Nov. 6, 1992

[30] Foreign Application Priority Data

Nov. 6, 1991 [FR] France ................... 91 13770

[51] Int. Cl.$^6$ ............................................. H04L 7/00
[52] U.S. Cl. ............................................. 375/371; 375/373
[58] Field of Search ................................. 375/114, 116, 375/119, 110, 120, 118, 81, 98, 365, 368, 373, 359, 376, 371, 327, 345; 370/105.1, 105.4, 105.5

[56] References Cited

U.S. PATENT DOCUMENTS

| | | | |
|---|---|---|---|
| 3,746,800 | 7/1973 | Stuart | 178/69.5 R |
| 4,031,478 | 6/1977 | Clark | 328/134 |
| 4,686,484 | 8/1987 | Otani | 329/109 |
| 5,005,190 | 4/1991 | Itoi | 375/119 |
| 5,208,833 | 5/1993 | Erhart et al. | 375/113 |
| 5,245,637 | 9/1993 | Gersbach et al. | 375/119 |
| 5,297,172 | 3/1994 | Shenoy et al. | 375/120 |

FOREIGN PATENT DOCUMENTS 0918701  7/1992  European Pat. Off. .

*Primary Examiner*—Stephen Chin
*Assistant Examiner*—T. Ghebretinsae
*Attorney, Agent, or Firm*—Antonelli, Terry, Stout & Kraus

[57] ABSTRACT

In order to restore a clock signal which has been used for coding signals transmitted on a transmission channel, the transition instants of these signals are precisely detected by analyzing a series of samples taken from the signals during at least one fraction of the clock period. A device first determines the deviations between the respective amplitudes of the various samples that have been taken. Comparison of the deviation configuration obtained with standard configurations that have been determined previously makes it possible to estimate the position of the time window where the sampling was achieved in relation to the analyzed period fraction and therefore to decide whether this window is correctly centered. If it is not, a local clock is phase shifted so as to have the time window resynchronized.

25 Claims, 2 Drawing Sheets

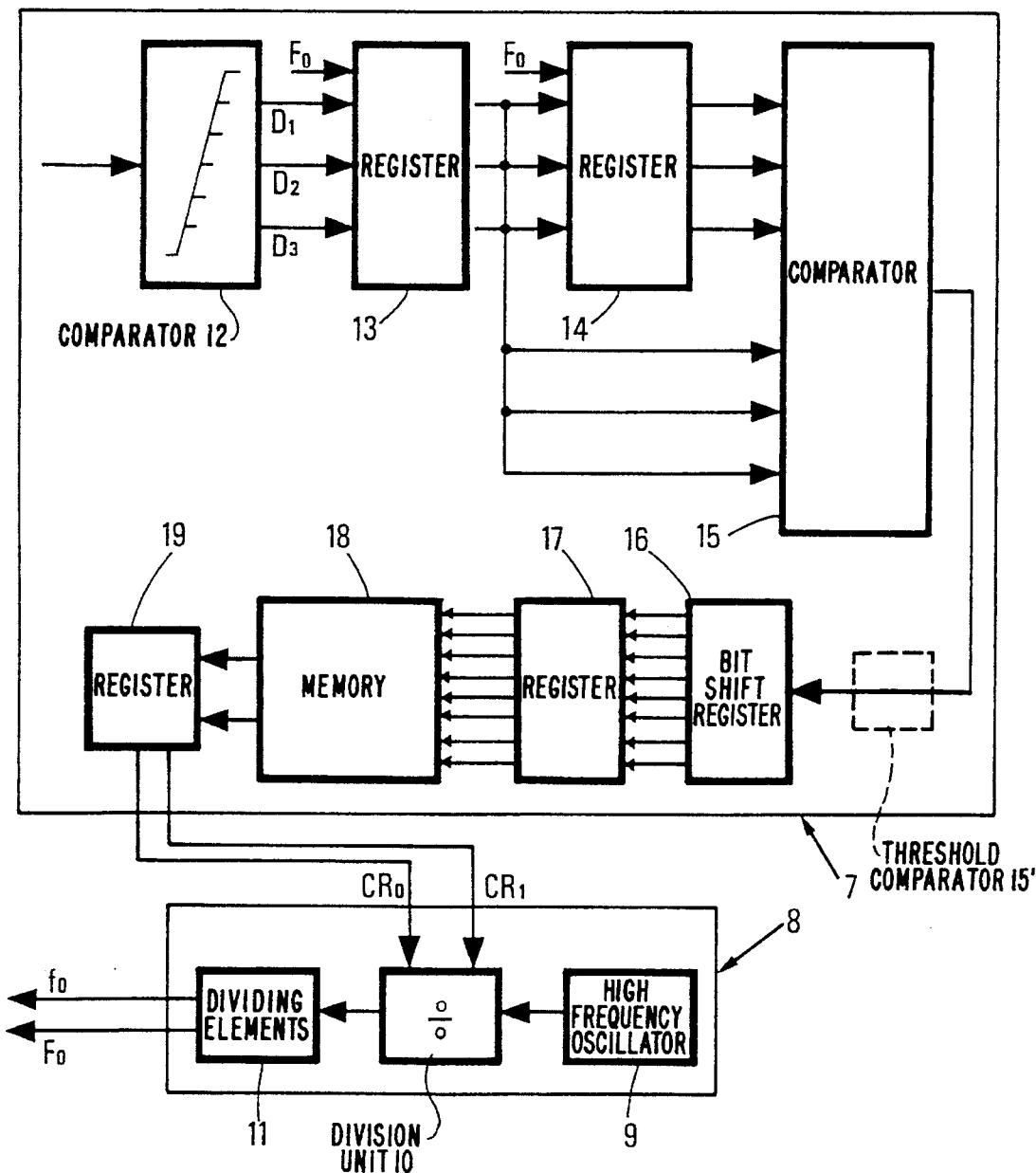

METHOD AND DEVICE FOR RESTORING A CLOCK SIGNAL PUNCTUATING THE TRANSMISSION OF RECEIVED SIGNALS

BACKGROUND OF THE INVENTION

The present invention relates to a process and to a device for restoring, from signals received on any transmission channel, a clock signal marking the transmission on the channel of digitized and coded data.

The invention may be used in transmission systems applying to bipolar data codes such as code HDB3, but it is useful particularly in systems for the simultaneous transmission of several data items such as multilevel transmission systems.

DESCRIPTION OF THE PRIOR ART

In multilevel transmission systems, the digitized data to be transmitted are coded from a definite number of different voltages of constant amplitude of, for example, 4, 8, 16 or 32 coding levels symmetrical for example on either side of the 0-volt level. Thus, with $2^n$, n bits may be transmitted simultaneously and the transmission rate of a transmission channel may be increased thereby. An application of a transmission on a cable using a multilevel coding is for example described in the published French patent application FR-A-2 675 974.

A well-known process for restoring a clock signal marking a coded transmission consists of applying the coded signals to a frequency and phase lock loop. The signal received is for example mixed with a signal generated by a local oscillator controlled through a voltage (VCO) (or a derived signal), and a low frequency component extracted from the combined signal is applied to a control input of the local oscillator which locks onto the frequency of the signal received (or on a proportional frequency) after an adjusting time varied according to the initial phase deviation. With the clock signal marking the transmission being restored through this adjusting of the lock loop, it is then possible to position precisely a window for measuring the level (or amplitude) of the voltage received between any two successive transitions of the coded signals received. Level determination errors may occur when an improperly centered measuring window extends over a transition time interval, and these errors about the coded signal may be avoided if the window is precisely positioned. Detection of the amplitude received should be all the more rigorous because the deviation between the possible voltage levels to be recognized is smaller on account of the increase in the number of the coding levels used. Detection windows should thus be positioned with high precision and a perfect frequency and phase restitution of the clock signal is therefore necessary so as to synchronize a local clock.

SUMMARY OF THE INVENTION

The object of the invention is to achieve an accurate restitution, from signals received on a transmission channel, of a clock signal of period T marking the transmission on the transmission channel of digitized and coded data, through the precise detection of the successive transitions of the coded signals received in order to synchronize the phase of a local clock.

The process comprises the steps:

sampling the coded signals received during time intervals including each at least one transition between two different levels of the received coded signals, at a sampling frequency much higher than that of the received clock signal so as to obtain a series of successive samples, said sampling frequency being imposed by a local clock;

determining level deviations of the successive samples of the series to form a deviation configuration;

comparing the deviation configuration with a file of reference deviation configurations produced when a sufficient synchronism of the local clock with the coded signals exists and if the deviation configuration does not correspond to any configuration stored in the file; and correcting the frequency or the phase of the local clock, so as to restore a sufficient similarity with a configuration stored in the file at the time of a later transition.

The step of comparing the deviation configuration with the file of reference deviation configurations is achieved by associating directly for example, with each set or configuration of obtained level deviations, signals indicative of the possible correction to be made to the frequency or to the phase of the local clock.

The process can also comprise binary coding of the deviations after comparison with a threshold amplitude.

The device allowing a clock signal marking the transmission of signals received on a transmission channel to be restored and a local clock to be phased in accordance with the process comprises means for modifying the level of the signals received on a transmission channel, a local clock for providing clock pulses at a frequency much higher than the frequency of the clock signal, means for sampling at the sampling frequency the signals received during time intervals including each at least one level transition between different levels of the received coded signals, said sampling means providing a series of signal samples, means for determining a level deviations of the samples in each of the series and determining therefrom a deviation and storage means for reference deviation configurations for associating, with each of the deviations configuration control signals indicative of the correction to be applied to the local clock for restoring synchronization with the clock signal.

The sampling means preferably deliver successive digital words, the means for determining the level of deviation comprises two registers for containing the successive digital words, means for comparing the successive digital words contained in the two registers, and storing means for storing the deviation configuration.

The means can for comparing include means for comparing each deviation with a threshold deviation.

The storage means comprises a storage element for digital words representative of corrections to be made to the local clock. This storage element has address inputs connected to the storing means, and a local clock comprising a high frequency oscillator, first frequency dividing means for dividing the frequency of the signal of the oscillator by several different factors around a central value, and for selecting one of the factors as a function of the control signals received from a decoding means and second dividing means connected to the first dividing means for generating a first signal at the same frequency ($f_o$) as the received clock signal and a synchronization signal at a frequency ($F_o$) multiple of the first signal.

The sampling means may comprise an analog-to-digital converter.

The frequency ($F_o$) of the synchronization signal can be selected in order to obtain $2^n$ samples (n being determined integer) during one transition and sampling means delivers n-bit digital words for each one of the samples.

BRIEF DESCRIPTION OF THE DRAWINGS

Other features and advantages of the process and of the device in accordance with the invention will be clear from reading the following description of an embodiment given by way of non limitative example with reference to the accompanying drawings in which:

FIG. 9 shows more detailed the diagram of FIG 8.

DESCRIPTION OF THE PREFERRED EMBODIMENTS

Figure 1:
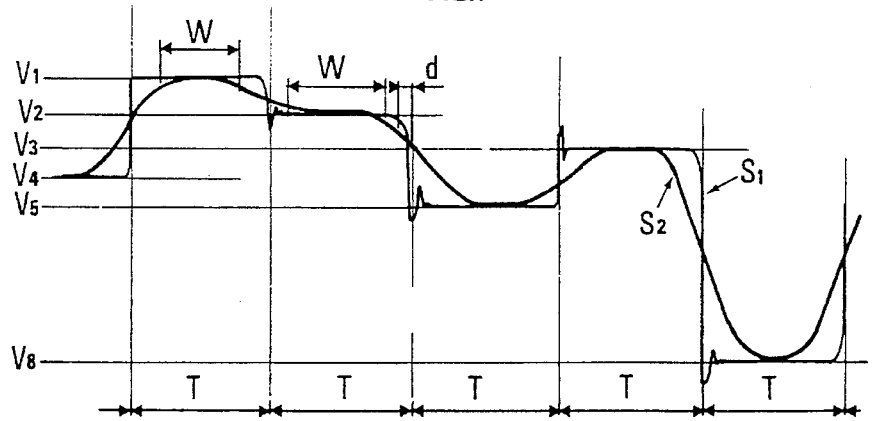
FIG. 1 shows two examples of multiple level transmission distorted signals received on a transmission channel.

Signals $S_1$ or $S_2$ such as those shown in FIG. 1 are obtained from a certain number of voltages of fixed amplitude (eight or sixteen for example). A particular combination of binary signals, which may be transmitted simultaneously on a transmission channel, as it is well-known in the art, corresponds to each one of its successive segments or levels N1 ... Np. Thus, precise determination of the level of each of the segments of the signal received on this channel makes it possible to restore the binary signals transmitted. Measurement of each of the levels is achieved during a window W which must be properly centered on each of the segments of duration T so as to avoid errors in the recognition of the level. Centering of each of the windows is performed by a local clock and it can only be precise if this clock is perfectly adjusted to that which has been used for marking the transmission of the signals on the transmission channel. The transition instants of the signals received must therefore be precisely detected, even when they are more or less distorted because of imperfections of the transmission channel and of the output device like signal $S_2$.

Figure 2:
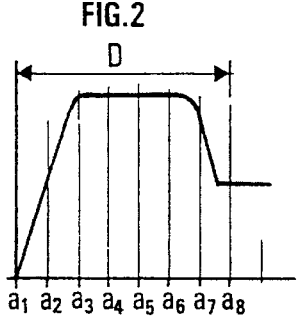
FIG. 2 shows a sampling time interval placed correctly with respect to a particular portion of signal received, in the case where the local clock is actually synchronous with the clock signal marking a received signal.
Figure 4:
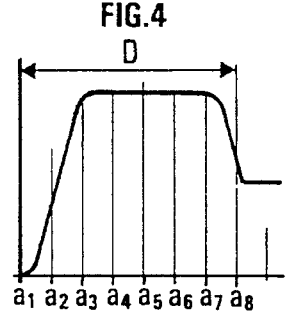
FIGS. 4 and 5 are analogous to FIGS. 2 and 3 and they correspond to the situation where the sampling time interval is improperly centered because of a desynchronization of the local clock.
Figure 6:
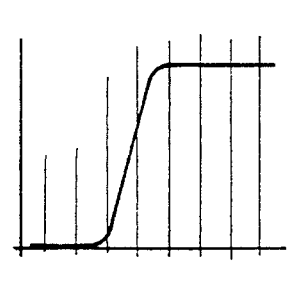
FIGS. 6 and 7 correspond to the case where a sampling window straddles a transition of the signal and the corresponding digital word obtained is selected.

The process in accordance with the invention first comprises sampling the coded signals received during time intervals D including each at least one level transition of the coded signals received. This sampling step may be achieved at more or less long time intervals. It is however advantageous to carry it out preferably at each of the successive periods of the signal received for a higher precision. The sampling frequency and the interval duration D are selected so as to obtain a determined number of distinct samples. FIGS. 2 and 4 show that the sampling time interval D is centered on a period of the signal and that 8 samples a1, a2, ..., a8 are successively taken during this interval.

Figure 3:
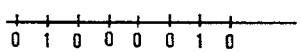
FIG. 3 shows a numeric word indicating the level deviations between the samples taken in the signal of FIG. 2.
Figure 5:
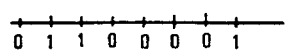
Figure 7:
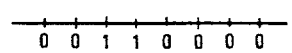

The process then comprises comparison of the respective amplitudes of the successive samples taken so as to determine their deviations. If two successive samples have the same level (or amplitude), their deviation is allotted the value 0. When their levels are different, the logical value 1 is allotted to their deviation. An 8-bit binary word may thus be associated with each set of samples. FIGS. 3 and 5 show that the numeric words obtained are different respectively depending on whether the centering of interval D in relation to a portion of signal chosen is correct, and whether one is not desynchronized with respect to the other.

Each binary word obtained is compared with a predetermined file of binary words. Each one of them corresponds to a determined deviation configuration indicative of the centering quality of the transition sampled in relation to time interval D.

If, through this comparison, the deviation configuration of the samples taken is recognized as good, this means that the time interval D has been properly centered and thus that the local clock is definitely synchronous with the clock signal received. In the other cases, and according to the configuration, the frequency and the phase of the local clock are corrected so as to set it perfectly in phase with the clock signal received, as will be described hereafter.

Positioning of the sampling window with respect to the signal may be achieved in any way. It may be centered on the signal transitions for example, if one chooses to detect the instants when they occur or on the signal periods so as to detect the middle of the successive periods.

Figure 8:
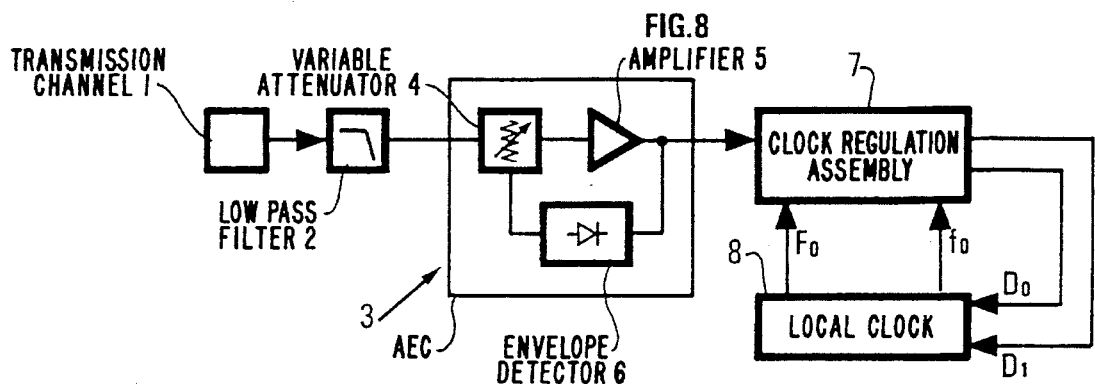
FIG. 8 diagrammatically shows a device in accordance with the invention.

In the device implementing the process illustrated in FIG. 8, the coded signals coming from the transmission channel 1 used are applied to a low-pass filter 2. Attenuation of the filtered signals, due to transmission, is compensated by an automatic gain control assembly 3 including a variable attenuator 4, an amplifier 5 and an envelope detector 6 connected to the output of amplifier 5, which controls the attenuation factor of attenuator 4. The signals coming from automatic gain control assembly 3 are applied to a clock regulation assembly 7 which receives, from a local clock 8, clock signals at frequencies which are multiples of one another, this assembly being used to detect the clock signals marking the signals received, and in return to output correction signals $D_o$ and $D_1$ capable of adjusting if need be the frequency of the local clock 8 so as to resynchronize it.

The local clock 8 illustrated in FIG. 9 comprises (FIG. 9) a high frequency oscillator 9 and a division unit 10 for dividing the frequency of the signal of oscillator 9 by several integers around one central factor. In practice, 3 integers 7, 8 and 9 are for example chosen, the central integer being then 8. The purpose of this division unit 10 is also to select one of the three resulting signals as a function of the correction signals $CR_0$ or $CR_1$. The local clock also comprises dividing elements 11 receiving the selected signals and, after division, producing a synchronized clock signal of frequency $f_o$ and another signal of frequency $F_o=16.f_o$.

The clock regulation assembly 7 illustrated in FIG. 9 comprises a comparator 12 for comparing continuously the amplitude of the regulated signals coming from assembly 3 with 7 increasing amplitude thresholds for example and delivering in response 3-bit numeric words $D_o$, $D_1$, $D_2$. This comparator 12 advantageously consists of an analog-to-digital converter. The digital words are applied to two registers 13, 14 at successive sampling instants set by the clock signal at the clock frequency $F_o$. The two registers 13, 14 are connected in series so that the numeric words pass successively from one to the other. These consecutive digitized words or samples are compared to one another at the same frequency by a comparator 15 for determining their possible deviation. The comparator delivers a logical 1 if any two digitized samples have different amplitudes, and a logical 0 if they have not. The binary values coming successively from comparator 15 are transferred into an 8-bit shift register 16. The 8-bit words formed are stored in a register 17. Each one of these 8-bit words corresponds to a deviation configuration representative of the signal sampled during time interval D.

The following operation, which consists in recognizing whether each configuration is acceptable, is achieved in a storage element 18 of the PROM type.

To that effect, the parallel outputs of register 17 are connected to the inputs of memory 18 allocated to designate the address. Each one of the numeric words applied thus refers to an address of memory 18 where a 2-bit numeric word $CR_0$ and $CR_1$ is stored, which will be used for defining whether the frequency of the local clock needs to be corrected, as well as the direction of this possible correction. Each 8-bit word coming from register 17 represents at the same time a standard configuration and the address of memory 18 where the appropriate answer to be given as a function of the configuration obtained is recorded. The comparison process is achieved automatically by taking out of the memory, at the designated address, the signals representative of the correction to be achieved.

A certain number of the stored signals correspond to instances where the synchronism between the frequency of the clock detected on the transmission channel and the local clock is considered as correct. Others stored signals correspond to instances where the local clock is advanced with respect to the clock transmitted signal. Other stored signals correspond to instances where the local clock is retarded with respect to the transmitted clock signal. PROM memory 18 is therefore loaded so that the numeric word $CR_0$, $CR1$ read at the address defined by the configuration indicates the possible correction to be achieved. No correction is achieved with $CR_0=0$ and $CR_1=0$. If $CR_0=0$ and $CR_1=1$, the local clock is to be advanced, but if $CR_0=1$ and $CR_1=0$, the local clock is to be retarded.

The digital words $CR_0$, $CR_1$ from memory 18 are successively loaded into a register 19 and are applied to the division unit 10. Register 19 acts as an integrator. It applies a mean correction calculated from a determined number of successive measuring cycles and thus makes it possible to avoid possible jitter.

If the signal of the local clock appears to be advanced with respect to the clock transmitted, applying the appropriate corrective signal $CR_0$, $CR_1$ leads to the selection of a higher division factor (here 8) for division unit 10, so as to decrease the frequencies $f_o$ and $F_o$ produced by dividing elements 11. On the other hand, when the local clock is retarded selection of the lower division factor (7 in the example) by division unit 10 is made to increase the frequencies $f_o$ and $F_o$.

The transmission channel on which the coded signals are received may be a transmission line. It may also consist of a radio channel made up of a carrier modulated with a modulation of a known type appropriate for the signals to be transmitted.

In the embodiment described, possible desynchronizations are detected through deviation configuration analyses comprising 8 samples taken during a time interval corresponding substantially to one period of the clock transmitted. However, any other number sufficient for achieving a precise estimate of the synchronism between the local clock and the clock signal received may be selected, or the duration of the sampling time interval may be changed without departing from the scope of the invention.

In the embodiment described, the logical coding of the deviations is achieved by a comparator 15 without weighting. The deviations may be weighted without departing from the scope of the invention, the logical value 1 being allocated to the deviation only if it is higher than a determined threshold value so as to eliminate certain insignificant level fluctuations which have no effect on the quality of the synchronism detection. To that effect, a threshold comparator 15' may be interposed in this case between comparator 15 and register 16.

Without departing from the scope of the invention, the local clock described with its frequency dividing elements may be replaced by a clock of another type which may be resynchronized through correction signals obtained with the process described.

A sharper correction of the local clock may be obtained by increasing the frequency of oscillator 9 and at the same time the division factors applied by division unit 10.

I claim:

1. A process for synchronizing a local clock signal with a clock signal marking transmission of data on a transmission channel by determining when successive samples of the data change in amplitude level to control frequency or phase of the local clock signal comprising:

sampling the data, during time intervals shorter than a period of the data with each time interval including at least one amplitude transition between two amplitude levels, with a sampling frequency higher than a frequency of the local clock signal and proportional to the frequency of the local clock signal to produce a successive series of samples of the data within each time interval;

determining level deviations of the data between each successive sample of the data within each time interval to form a deviation configuration;

comparing the deviation configuration with a stored file of reference deviation configurations representative of the local clock signal being both in and out of phase with the clock signal marking the transmission of the data; and correcting one of the frequency or the phase of the local clock signal to cause subsequently formed deviation configurations to correspond to a reference configuration stored within the file representative of the local clock signal being in phase with the clock signal marking the transmission of the data.

2. A process in accordance with claim 1 further comprising:

associating with each stored reference deviation configuration a correction to be made to correct the frequency or the phase of the local clock signal.

3. A process in accordance with claim 1 wherein:

the determining level deviations of the data between each successive sample comprises digitizing a difference between successive samples.

4. A process in accordance with claim 1 wherein:

the determining level deviations of the data comprises forming digital differences between successive digitized samples; and further comprising coding each of the digital differences in binary.

5. A process in accordance with claim 1 wherein:

the level deviations are encoded as either a binary 0 or 1.

6. A device for synchronizing a local clock signal with a clock signal marking transmission of data on a transmission channel by determining when successive samples of the data change in amplitude level to control one of frequency or phase of the local clock signal comprising:

a local clock producing the local clock signal and a sampling signal having a frequency higher than a frequency of the local clock signal and proportional to the frequency of the local clock signal;

a sampling circuit, coupled to the local clock and responsive to the sampling signal, for sampling the data at the frequency of the sampling signal during time intervals shorter than a period of the data with the data during each time interval including at least one amplitude transition between two amplitude levels to produce a successive series of samples of the data within each time interval;

means, coupled to the sampling circuit, for determining level deviations of the data between each successive sample of the data within each time interval to from a deviation configuration;

a storage, coupled to the means for determining, for storing a file of reference deviation configurations representative of the local clock signal being both in and out of phase with the clock signal marking transmission of the data; and means, coupled to the storage, for controlling the local clock to correct one of the frequency or the phase of the local clock signal to cause subsequently formed deviation configurations to correspond to a reference configuration stored within the file representative of the local clock signal being in phase with the clock signal marking the transmission of the data.

7. A device in accordance with claim 6 further comprising:

an analog to digital converter for converting the successive samples of the data into successive digital words; and wherein the means for determining level deviations comprises two serially connected registers for storing the successive digital words, means coupled to the two serially connected registers for subtracting the digital words stored in the two serially connected registers to determine if a difference exists between the digital words stored in the two serially connected registers and a storage, coupled to the means for subtracting, for storing a result of the subtraction of the digital words.

8. A device in accordance with claim 6 wherein the means for determining level deviations comprises:

means for forming a difference between each successive sample and coding the formed difference in binary.

9. A device in accordance with claim 7 wherein:

the storage comprises a storage element for storing digital words representative of corrections to be applied to the local clock by the means for controlling, the storage element being addressed with address inputs connected to a register and being coupled to the means for subtracting the digital words; and the local clock comprises an oscillator generating a higher frequency signal, a first frequency divider for dividing the higher frequency signal by a series of increasing integers centered about a central integer which is within the series and for selecting one of the integers as a function of the digital words stored by the storage element, and a second frequency divider coupled to the first frequency divider for generating the local clock signal and the sampling signal.

10. A device is claimed in claim 6 wherein:

the sampling circuit comprises an analog to digital converter.

11. A device as claimed in claim 6 wherein:

the sampling frequency is selected to provide $2^n$ successive samples during each time interval with the sampling circuit producing n-bit words defining an amplitude of each sample with n being an integer.

12. A device in accordance with claim 6 wherein said means for controlling further comprises:

an integrator for integrating an output of the storage to produce at least one control signal for controlling the local clock.

13. A device in accordance with claim 6 wherein:

the level deviations are encoded as either a binary 0 or 1.

14. A process for synchronizing a local clock signal with a clock signal marking transmission of coded signals on a transmission channel by determining when successive samples of the coded signals change in amplitude level to control frequency or phase of the local clock signal comprising:

sampling the coded signals, during time intervals shorter than a period of the coded signals with each time interval including one amplitude transition between two amplitude levels, with a sampling frequency higher than a frequency of the local clock signal and proportional to the frequency of the local clock signal to produce a successive series of samples of the coded signals within each time interval;

determining level deviations of the coded signals between each successive sample of the coded signals within each time interval to form a deviation configuration;

comparing the deviation configuration with a stored file of reference deviation configurations representative of the local clock signal being at least out of phase with the clock signal marking the transmission of the coded signals; and correcting one of the frequency or the phase of the local clock signal to cause subsequently formed deviation configurations to correspond to a reference configuration stored within the file representative of the local clock signal being in phase with the clock signal marking the transmission of the coded signals.

15. A process in accordance with claim 14 further comprising:

associating with each stored reference deviation configuration a correction to be made to correct the frequency or the phase of the local clock signal.

16. A process in accordance with claims 14 or 15 further comprising:

digitizing a difference between successive samples.

17. A process in accordance with claims 14 or 15 wherein:

the determining level deviations of the coded signals comprises subtracting successive digitized samples and coding the subtractions in binary.

18. A process in accordance with claim 14 wherein:

the level deviations are encoded as either a binary 0 or 1.

19. A device for synchronizing a local clock signal with a clock signal marking successive instants at which occur transitions of amplitude levels of coded signals transmitted on a transmission channel by determining when successive samples of the coded signals change in amplitude level to control one of frequency or phase of the local clock signal comprising:

a local clock producing the local clock signal and a sampling signal having a frequency higher than a frequency of the local clock signal and proportional to the frequency of the local clock signal;

sampling circuit, coupled to the local clock and responsive to the sampling signal, for sampling the coded signals at the frequency of the sampling signal during time intervals shorter than a period of the clock signal with each time interval including each at least one amplitude transition between two amplitude levels to produce a plurality of successive samples of the coded signals within each time interval;

means, coupled to the sampling circuit, for determining level deviations of the coded signals between each successive sample of the coded signals within each time interval to form a deviation configuration;

a storage, coupled to the means for determining, for storing a file of reference for deviation configurations respectively representative of coded correction signals to be applied to the local clock when the deviation configuration departs from a determined list of permissible deviation configurations; and means, coupled to the storage and responsive to the coded correction signals, for controlling the local clock to correct one of the frequency or the phase of the local clock signal to cause subsequently formed deviation configurations to correspond to a reference deviation configuration stored within the file.

20. A device in accordance with claim 19 further comprising:

an analog to digital converter for converting the successive samples of the coded signals into successive digital words; and wherein the means for determining level deviations comprises two serially connected registers for storing the successive digital words, means coupled to the two serially connected registers for subtracting the digital words stored in the two serially connected registers and coding subtraction results, and a third register for storing the successive coded subtraction results.

21. A device in accordance with claim 20 wherein the means for determining level deviations comprises:

means for forming a difference between successive digital words representative of each successive sample of the coded signals and for binary coding the formed difference.

22. A device in accordance with claim 19 wherein:

the storage comprises a storage element for storing digital words representation of the corrections to be applied to the local clock with the storage element being provided with address inputs connected with said third register; and the local clock comprises an oscillator generating a higher frequency signal, a first frequency divider for dividing the higher frequency signal by a series of increasing integers centered about a central integer which is within the series and for selecting one of the integers as a function of the digital words stored at the address of the storage element indicated by the third register, and a second frequency divider, coupled to the first frequency divider, for generating the local clock signal and the sampling signal.

23. A device as claimed in any one of claims 19 or 21 wherein:

the sampling circuit comprises an analog to digital converter.

24. A device as claimed in any one of claim 19–22 wherein:

the sampling frequency is selected to provide $2^n$ successive samples during each time interval with the sampling circuit producing n-bit words defining an amplitude of each sample with n being an integer.

25. A device in accordance with claim 19 wherein:

the level deviations are encoded as either a binary 0 or 1.

* * * * *